Jan. 13, 1970     R. GRESL ET AL     3,489,637
DEVICE FOR APPLYING TAPE
Filed April 16, 1965     6 Sheets-Sheet 1
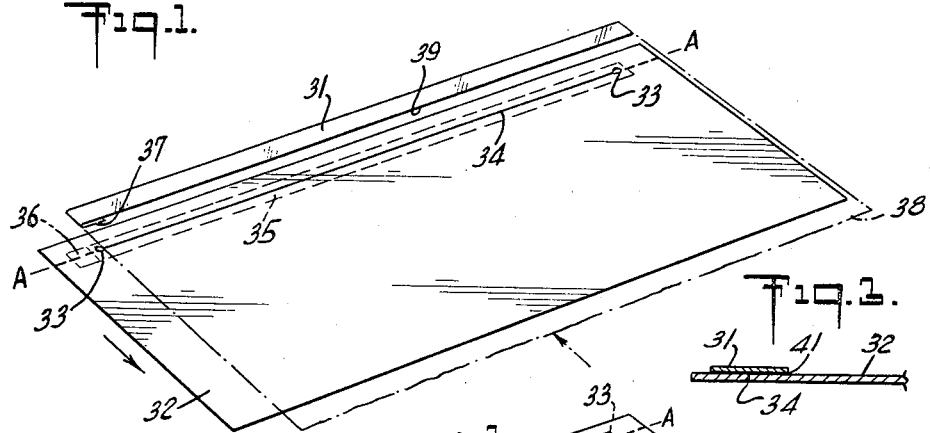
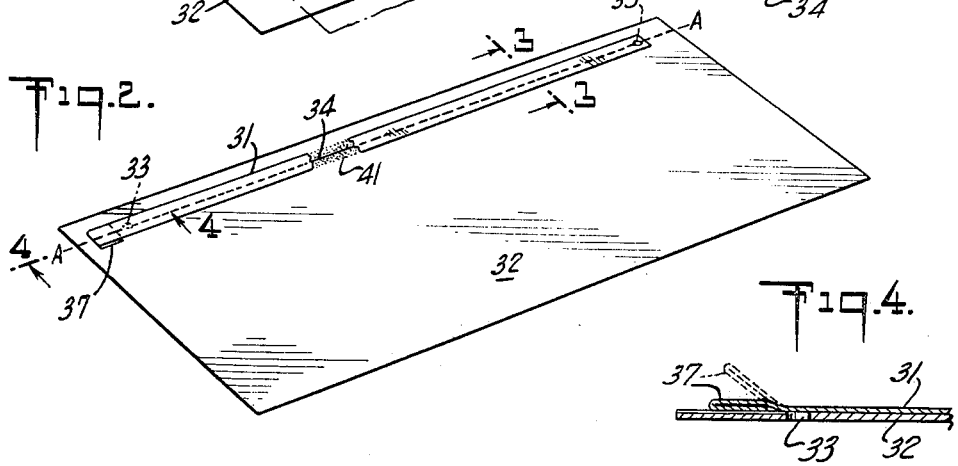
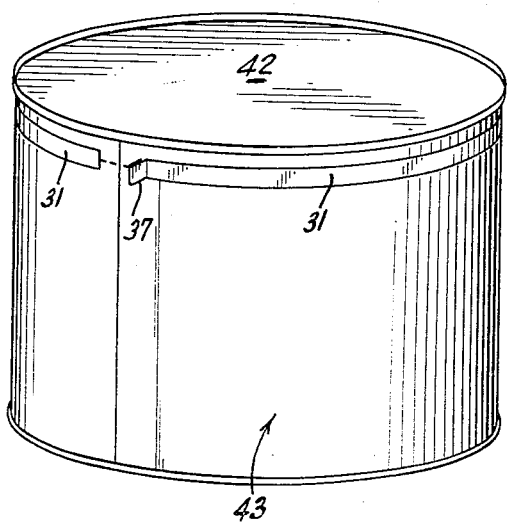
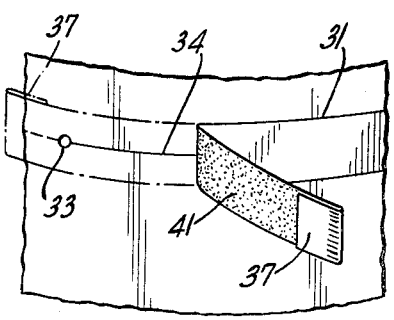
INVENTORS:
ROBERT GRESL
GEORGE J. PHILIPPI
BY
Charles A. Harris
ATTORNEY.

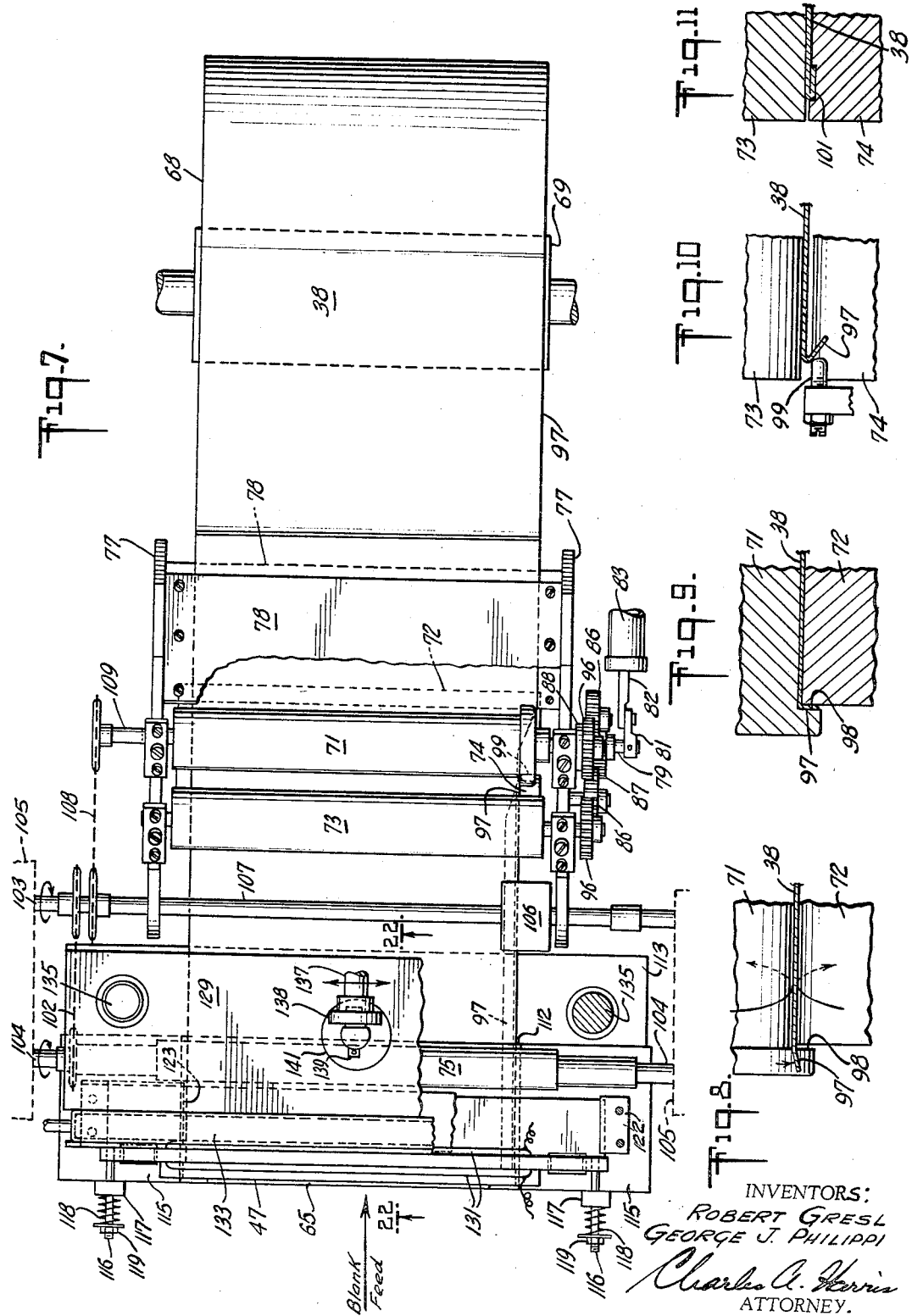

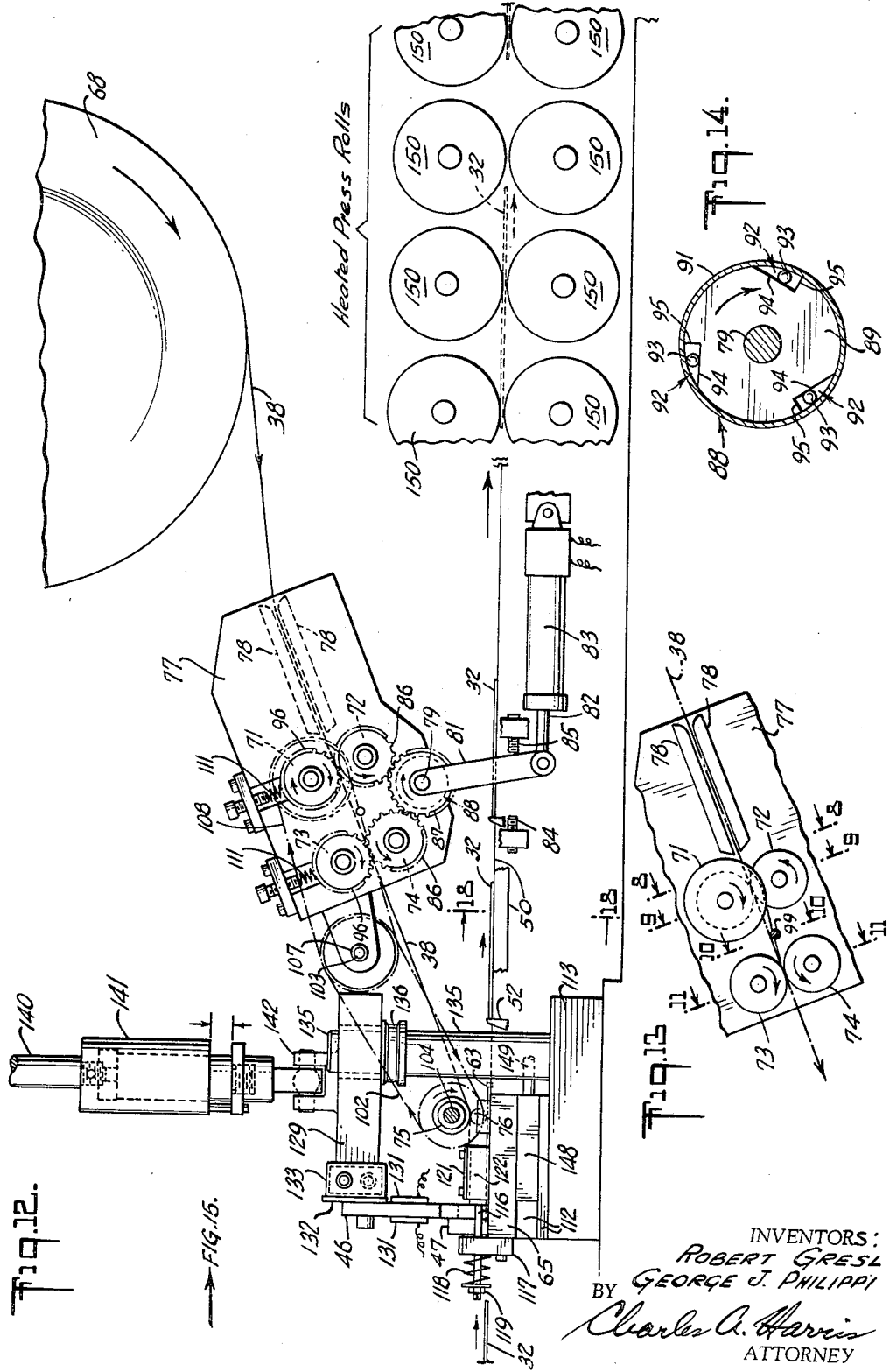

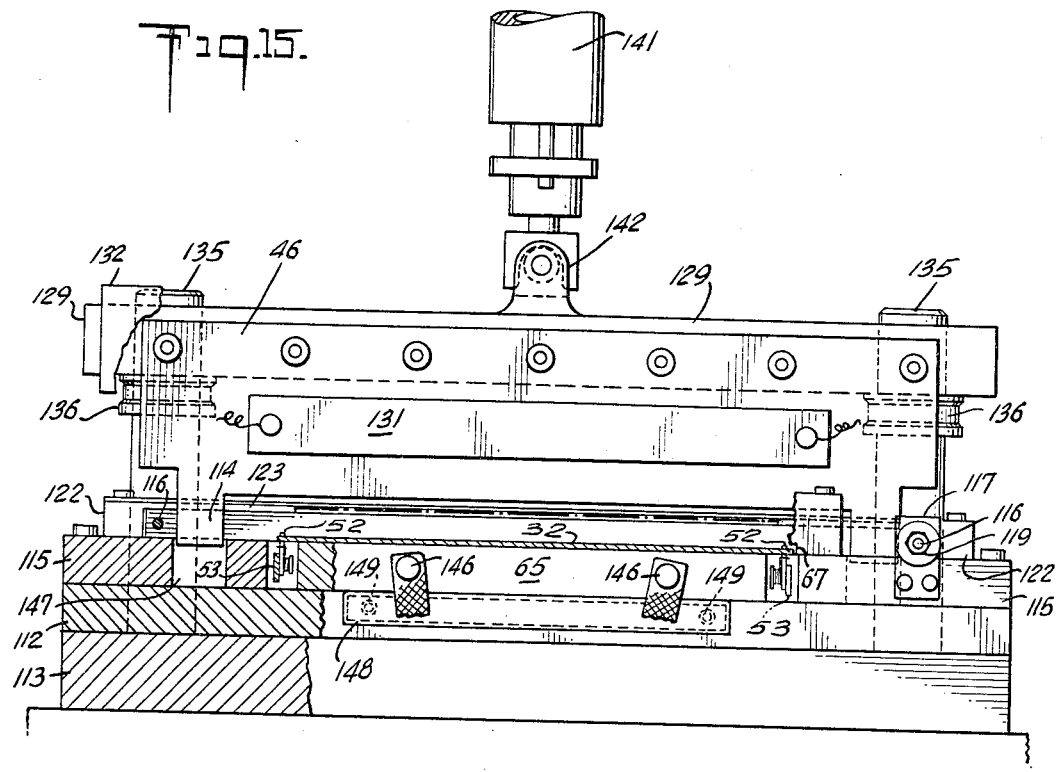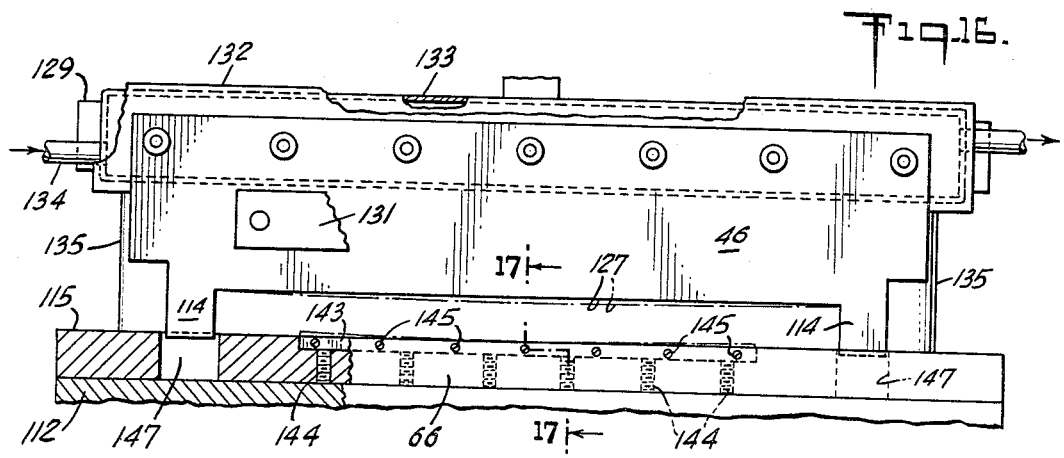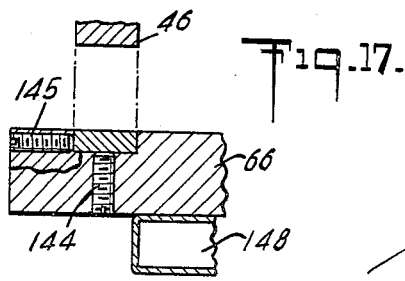

Jan. 13, 1970    R. GRESL ET AL    3,489,637
DEVICE FOR APPLYING TAPE
Filed April 16, 1965    6 Sheets-Sheet 5
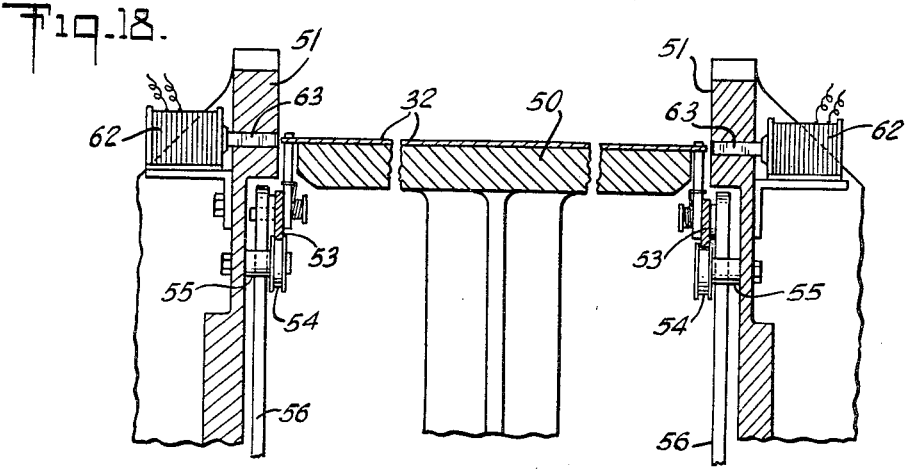
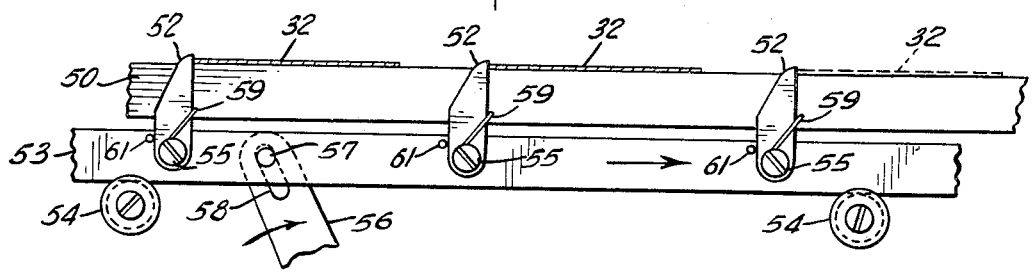
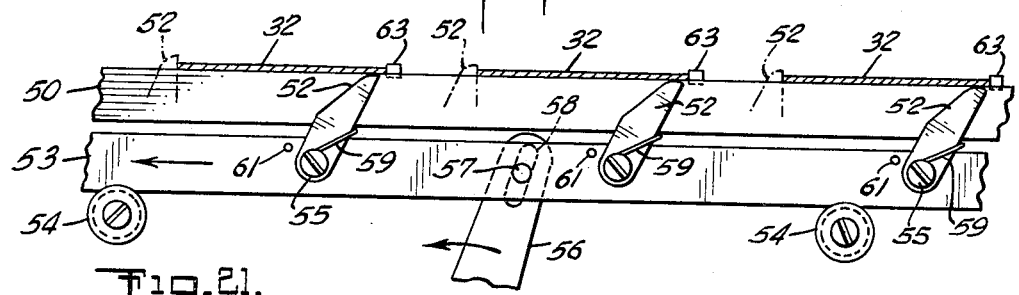
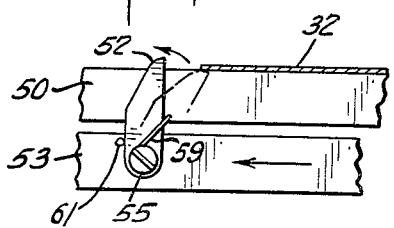
INVENTORS:
ROBERT GRESL
GEORGE J. PHILIPPI
BY
Charles A. Harris
ATTORNEY.

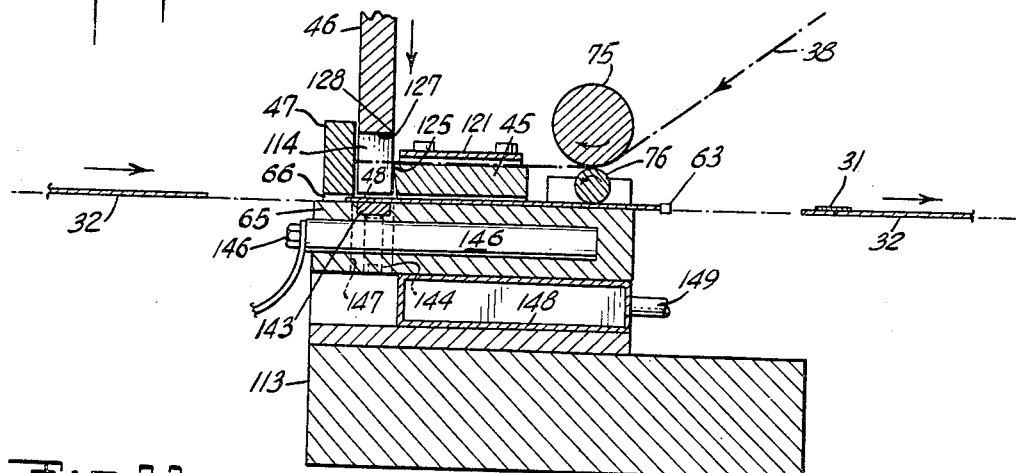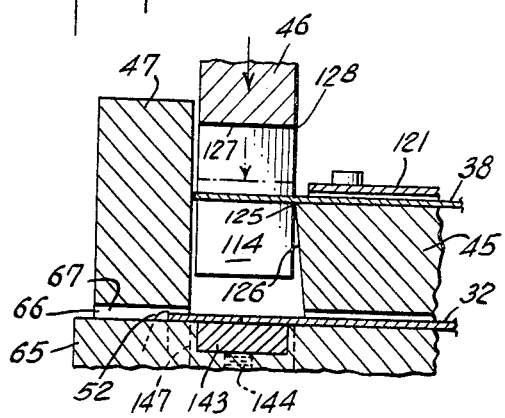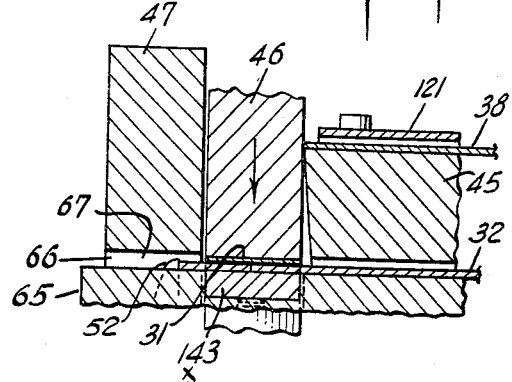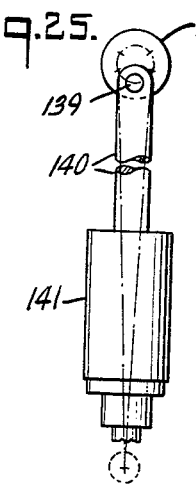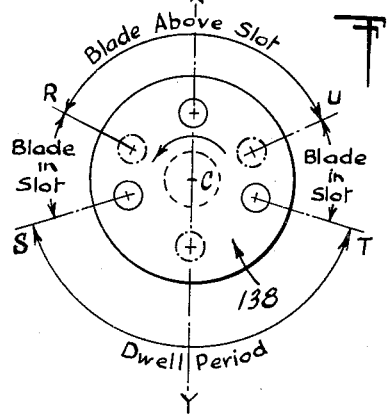

United States Patent Office 3,489,637
Patented Jan. 13, 1970

3,489,637
DEVICE FOR APPLYING TAPE
Robert Gresl, North Brunswick, and George J. Philippi, Plainfield, N.J., assignors to Johnson & Johnson, a corporation of New Jersey
Filed Apr. 16, 1965, Ser. No. 448,797
Int. Cl. B32b 31/20; C09j 5/00; B26d 5/08
U.S. Cl. 156—521                              8 Claims

ABSTRACT OF THE DISCLOSURE

A device for applying an elongated strip of adhesive sheet material to a blank, or application sheet, adapted to pass under a supply sheet of said adhesive material, which comprises a fixed shearing blade above the application sheet which presents a fixed shearing edge spaced above the application surface, a guide extending transversely of the application sheet and spaced from said fixed blade to define an elongated application slot therewith, and a movable shearing blade comprising an elongated pressing foot approximately as wide as said slot and a movable shearing edge for cooperating with the fixed shearing edge for severing the adhesive strip from the supply sheet thereof above the application surface as the movable blade enters the application slot. The movable blade severs the strip and then presses it down into contact with and flat against the application sheet all along the length of the strip. The application sheet, or blank, may be moved into and out of position at the bottom of the application slot through a passageway provided underneath the fixed blade. Various other specific features of the device of this invention are described, including means rendering this device particularly suitable for the application of heat and pressure-sensitive adhesive sheet material to various surfaces including metal.

The present invention relates to methods and devices for applying adhesive tape material to the surfaces of various objects and most particularly to applying elongated strips of said material to these surfaces.

When the term adhesive tape or adhesive tape material is used herein, it refers to any sheet material which is especially adapted to be adhered to another surface and includes the conventional normally-tacky pressure-sensitive sheets and tapes, as well as those which are heat or heat and pressure activatable, only. Normally such tapes have a layer of adhesive material exposed to at least one surface of the tape, and the adhesive layer is applied to a support layer, called a backing, of fibrous or nonfibrous material which may even be of metal or some other inorganic material.

The present invention makes possible the very rapid and precise application of a given length of adhesive tape material to a given portion of the surface area of an object to be taped. This is true even though the tape is heat and pressure activatable and must be fixed to the application surface by applying heat and pressure for a definite time period. For instance, a single unit according to this invention, is capable of applying over 300 strips of tape per minute to successive articles to be taped. Elongated strips may be applied, in accordance with this invention, at this rate with great precision.

The device of this invention comprises a movable shearing blade which presents a flat pressing surface adjacent the cutting edge of the blade. The cutting edge and pressing surface of the moving blade has a length and width corresponding to the length and width of the tape to be applied to the surface of an article to be taped. The blade acts both to sever the tape from a sheet supply thereof and press the severed strip of tape down into contact with the application surface. In order to cushion the shock of the blade and the tape striking the application surface and, in order to provide a dwell period during which the pressing surface of the blade continues to press the tape into contact with the surface, the blade is resiliently driven into contact with the tape and the application surface. Preferably, the blade is reciprocated into and out of contact with the tape by continuously operating driving means and the blade is connected to the driving means by a resilient device which takes up the motion of the driving means and becomes compressed to apply increased pressure to the severed tape through said blade during the dwell period of the blade.

The method of this invention comprises applying an elongated strip of adhesive tape material to a correspondingly elongated area of an application surface by advancing a sheet of the tape material over the application surface transversely of the length of the application area with an adhesive side of the tape facing this area. The sheet is at least as wide as the length of the area and the end of the sheet is registered with the area. Then, the elongated strip is severed from the end of the sheet by cutting the sheet transversely along a line spaced from the end of the sheet by an amount corresponding approximately to the width of the application area. The strip is contacted as it is being severed and pressed flat against the application area of said surface all along the length of the strip. Preferably, the strip is severed from the sheet simultaneously all along the length of the strip and then pressed against the application area simultaneously all along the length of said area. It also is preferred that continuing pressure be applied to the strip simultaneously all along the length of the application area after the strip is pressed flat against said area. Preferably, also, the strip is completely severed from the sheet while the sheet is spaced from the application surface to assure that the object to be taped is not damaged during the severing step. When the tape is heat and pressure activatable, both heat and continuing pressure are applied to the strip after the strip is in contact with the application surface to adhere it to said surface.

In a preferred embodiment of this invention, the tape applying device comprises a fixed shearing blade extending over the application surface, guide means substantially parallel with the fixed blade and spaced therefrom to define a tape application slot therewith, and means for feeding a length of tape material over the fixed blade and across the tape application slot. The movable shearing blade is then mounted for reciprocal movement into and out of said slot to cooperate with the fixed blade for severing the tape. The tape is severed as the movable blade enters the slot and is immediately contacted by the pressing surface along the bottom of the movable blade and pressed flat against the application surface of the object to be taped. The fixed blade presents a fixed shearing edge spaced above the application surface and an end guide surface extending towards the application surface from said shearing edge. The movable blade presents a corresponding movable shearing edge for cooperating with the fixed shearing edge of the fixed blade for severing the tape. The tape application slot normally is slightly wider than the width of the strip to be severed by the blades and the guide means defining the slot with the fixed blade may be in the form of a continuous strip or plate extending along the length of the slot. The velocity of the movable blade towards the application surface is substantially greater than the free falling velocity of the severed tape so that the tape is held flat against the pressing surface as it is severed and remains flat in this position and does not fall from the blade before it is pressed into contact with the application surface. A table or supporting surface is provided underneath the object to be taped so that the object and the tape applied thereto are pressed between the table and the pressing surface of the blade during the dwell period of the blade. As the resilient connecting means driving the blade is compressed it increases the pressure applied to the tape to help fix the tape on the application surface.

The device and method of this invention are particularly adapted for applying an elongated strip of heat and pressure activatable tape to a flat blank and are highly advantageous for applying a metallic tear strip to a can blank. In this case, the metallic tear strip is intended to be applied to a blank which is preferably cut and scored so that after the blank is formed into a can and the tear strip is removed, the can may be opened merely by lifting off, or bending back, the top of the can. In this case, it is only the seal between the tear strip and the blank which holds the top on the can and assures a hermetic seal or, in the case of vacuum-packed coffee, a vacuum seal. Obviously the application of tape for this purpose must be accomplished with great precision. It also is necessary to manufacture and pack cans of this type at a high rate of speed for economic reasons. Thus, the fact that the device of this invention operates extremely rapidly and with great precision is of the utmost important in this application.

Other and further advantages of this invention will appear to one skilled in the art from the following description and claims taken together with the drawings wherein:

FIG. 1 is a view in perspective of a length of tape, and the sheet from which it was cut, in position over a can blank preparatory to being applied thereto in accordance with this invention.

FIG. 2 is a similar perspective view, partly broken away, of the tape of FIG. 1 after it has been applied to the blank in accordance with the invention.

FIG. 3 is an enlarged sectional view taken along the line 3—3 of FIG. 2.

FIG. 4 is an enlarged sectional view taken along the line 4—4 of FIG. 2.

FIG. 5 is a view in perspective of a can formed from the completed blank of FIG. 2.

FIG. 6 is an enlarged view of a portion of the can of FIG. 5 showing the tear tape as it is being removed from the can to give access to its contents.

FIG. 7 is a partly broken away top plan view of a tape applying device according to a preferred embodiment of this invention.

FIG. 8 is an enlarged view, partly in section and partly in elevation, taken along the line 8—8 of FIG. 13.

FIG. 9 is a similarly enlarged sectional view taken along the line 9—9 of FIG. 13.

FIG. 10 also is a similar sectional view, partly in section and partly in elevation, taken along the line 10—10 of FIG. 13.

FIG. 11 is a sectional view, at the same enlargement, taken along the line of 11—11 of FIG. 13.

FIG. 12 is a partly broken away view in elevation of the device of FIG. 7 also showing a series of heated press rolls somewhat reduced at one end of the device.

FIG. 13 is an elevational view of a portion of the device of FIG. 12 showing the feeding and folding rollers thereof with the drive gears and one end plate therefor removed for the sake of clarity.

FIG. 14 is a schematic view partly in section and partly in elevation of the Sprague clutch used for driving the feeding and folding rollers.

FIG. 15 is an end elevational view partly broken away and in section and taken from the left of FIG. 12.

FIG. 16 is an end view similar to FIG. 15 with different parts removed and in section.

FIG. 17 is an enlarged view partly in section and partly in elevation, taken along the line 17—17 of FIG. 16.

FIG. 18 is an enlarged view partly in section and partly in elevation taken approximately along the line 18—18 of FIG. 12 and showing the apparatus for guiding and driving the can blanks from one position to another.

FIG. 19 is a schematic view partly in section and partly in elevation illustrating the mechanism for registering the can blanks in each position and driving them from one position to another, and showing the beginning of the forward or feeding stroke of the mechanism.

FIG. 20 is a schematic view similar to that of FIG. 19 but showing the beginning of the return stroke of the mechanism of FIG. 19.

FIG. 21 is a similar view of only a portion of the mechanism of FIGS. 19 and 20 and showing the position of one of the driving dogs at the end of the return stroke of the driving mechanism.

FIG. 22 is an enlarged view partly in section and partly in elevation showing the tape applying device of the preceding figures with the movable blade in its uppermost position.

FIG. 23 is an enlarged sectional view of the application slot of FIG. 22 and showing the movable blade descending into contact with the tape positioned across the application slot.

FIG. 24 is an enlarged sectional view similar to FIG. 23 and showing the position of the blade after it has severed a length of tape from its supply and pressed it into contact with the application surface of the can blank.

FIG. 25 is an end elevational view of the means for driving the movable blade.

FIG. 26 is a diagram illustrating different positions of the continuously operating crank of the driving means of FIG. 25.

Referring to FIGS. 1–6 of the drawings, there is illustrated the method of applying an elongated strip 31 of adhesive tape sheet material to a can blank 32 in accordance with a preferred embodiment of the method of this invention. FIGS. 5 and 6 also illustrate the resulting can structure.

First, the can blank 32 to be taped is located in a fixed position. This blank 32 has previously been punched along the tear line A—A parallel to the adjacent longitudinal edge of the blank to form two holes 33, each spaced from an adjacent end edge of the blank, and then cut along this line to form a slit 34 between the two holes and scored beyond the holes. The tape is applied in the form of an elongated strip 31 to a definite application area 35 which covers the slit 34 between the holes 33 and the holes, themselves. This application area 35 is shown dotted surrounding the slit 34 and holes 33 at each end thereof. The dotted rectangle 36 at one end of the application area 35 represents the tear tab 37 of the strip, which is not to be adhered to the blank 32.

A sheet 38 of tape material, at least as wide as the length of the application area 35, is advanced over the application area transversely of the length of said area and with the adhesive side of the tape material facing said area. The sheet material 38 is shown in dot-dash lines in FIG. 1. The end of the sheet, represented in FIG. 1 by a solid length of tape 31, first is registered with the application area 35, that is, positioned directly above the application area. Then, the strip 31 to be applied to said area 35 is severed from the end of the sheet 38 by cutting the sheet transversely along a line 39 spaced from the end of the sheet by an amount corresponding to the width of the application area 35. In FIG. 1 this line 39 corresponds to the inside edge of the tape strip 31. The strip 31 is contacted all along its length as it is being severed and pressed flat against the application area 35 all along the length of said area, in a manner which will be described more fully hereinafter. As a result, the tape 31 is adhered to the application area 35 by the pressure applied to adhesive 41 on the underside of the strip severed from the sheet. As illustrated in FIGS. 2 and 4, the application area 35 of the blank extends beyond the hole 33 at the tab end of the blank to assure that the hole is completely closed by the seal formed between the tape and blank beyond the hole. The tab 37, however, is not sealed to the blank because the adhesive side of the tape is folded inwardly upon itself to form the tab 37 in such a way that there is no adhesive exposed under the tab to adhere the tab to the blank. After the tape strip 31 has been applied to the blank 32, as shown in FIG. 2, each end of the blank is free of the tape so that a can may be formed from the blank 32 in the conventional manner by attaching the two ends of the blank together and applying top and bottom discs 42 in the usual manner. The resulting can 43, ready for opening by pulling on the tab 37 to tear the tape 31 off the can is illustrated in FIG. 5, and the removal of the tear strip 31 by pulling on the tab 37 is illustrated in FIG. 6.

FIGS. 7-26 illustrate a device according to a preferred embodiment of this invention for applying the adhesive tape opening strips 31 to the blanks 32 of FIGS. 1-6. The blanks, which may be formed from a conventional tin plated steel can material, are precut along the line A—A to form the slit 34 between the holes 33, and the holes 33, in turn, are pre-punched. The scoring between the holes 33 and the ends of the blank also is completed in a preceding step. These steps of punching, cutting, and scoring the blanks 32 may be performed in conjunction with the tape applying step of this invention or independently thereof. As shown most clearly in FIGS. 12 and 22, the blanks 32 approach the tape applying device from one side, i.e., from the left of the figures, while the sheet 38 of tape material approaches it from the other side. As will be explained more fully hereinafter, the tape applying device comprises a fixed blade 45, a movable blade 46, and a guide plate 47; with the fixed blade and the guide plate defining an application slot 48 between them. The movable blade 46 cooperates with the fixed blade 45 to sever the tape strip 31 from the sheet 38 of tape material and apply the strip to the blank 32. Means are provided for feeding the blank 32 from the left, in FIGS. 12 and 22, underneath the guide plate 47 and the fixed blade 45 until the line A—A on the blank is approximately registered with the longitudinal center line of the application slot 48 and the application area 35 of the blank is registered with slot 48, itself. The end of the tape, on the other hand, is fed from the right over the fixed blade 45 and across the application slot 48 until it is registered with the application area 35 of the blank 32.

The means for feeding the blanks into and through the feeding device and from station to station thereafter and positioning them at each station is best illustrated in FIGS. 18-21. Before and after reaching the tape applying device, the blanks 32 move along a channel formed by a horizontal girder 50 and side plates 51 spaced from one another at each side of the girder. The blanks 32 rest on and slide along the top surface of the girder 50 with their side edges normally in contact with at least one of the side plates 51. Thus, the side plates 51 normally determine the lateral position of the blanks 32. The blanks 32 are driven over the girder 50 and into position in the tape applying device, itself, by a series of dogs 52 mounted in spaced relation from one another on a pair of driving bars 53. The driving bars 53 are mounted, one adjacent each of the side plates 51, in a series of grooved rollers 54 which, in turn, are rotatably mounted on bolts 55 attached to the side plates 51. The drive bars 53 are adapted to roll back and forth in the grooved rollers 54 and are driven first in one direction and then in the other by a reciprocally pivoting driving arm 56 connected to a driving device, not shown, which in turn is actuated in such a way as to move the blanks 32 into and out of position in timed relation with the operations being performed on the blanks, as will be described more fully hereinafter. Each of the driving arms 56 rotates back and forth through a fixed angle and is connected adjacent its outer end to one of the drive bars 53 by a pin 57 on the bar which fits into a slot 58 at the end of the arm and this slot and pin arrangement allows the arm 56 to drive the bar 53 in all positions of the arm. Each of the dogs 52 is spring-loaded upwardly by a hair spring 59 fitted around the bolt 55 on which the dog is mounted, and held in an upright position by a stop 61 extending outwardly from the driving bar 53.

FIG. 19 illustrates the mechanism of FIGS. 18–21 as it enters into driving relationship with the blanks 32 to move them from one position to the other. As the driving arms 56 rotate to the right they move the driving bars 53 and the dogs 52 extending therefrom in the same direction until the ends of the dogs 52 strike the edges of the blanks 32 and move them along the girder 50 from one position to another. As the blanks 32 approach their next position solenoids 62 are operated to extend stops 63 passing through the side plates 51 into the path of the blanks, as shown dotted in FIG. 18 and in full in FIG. 20. This results in the blanks being held in a given position by the side plates 51 in contact with the ends of the blanks, a pair of dogs 52 in contact with one longitudinal edge, and the stops 63 in contact with the leading edge of the blank. When the blanks 32 are to be moved from one position to another, the driving arms 56 are operated to return the driving bars 53 to their initial position and move them to the left, as shown in FIG. 20. As the mechanism is moved in this direction, the dogs 52 strike the blanks 32 and are caused to pivot downwardly against the hair springs 59 until the dogs are able to pass under the blanks, as shown in FIG. 20. After the dogs 52 clear the blanks 32, the hair springs 59 cause them to swing to their upright position as illustrated in FIG. 21. Subsequent movement of this mechanism in the opposite direction, i.e., to the right in FIGS. 19–21, would again move the blanks 32 to their next position. Of course, before the blanks could be moved in this manner, the solenoids 62 would be operated to retract the stops 63. This same mechanism operates to feed the blanks 32 into and out of the tape applying device and to hold them in position therein, as best illustrated in FIGS. 15, 23, and 24. However, the horizontal girder 50 is replaced by a table 65 and the side plates 51 are interrupted at the fixed and movable blades 45 and 46. The blanks 32 are held in position laterally, at this point by a feeding slot 66 formed under the guide plate 47. The slot 66 has vertical side walls 67 spaced to accommodate the long dimension of the blanks 32. Thus, the blank 32 is held in position underneath the fixed blade 45, with its application area 35 registered with the application slot 48, by the dogs 52 at one edge of the blank and the stops 63 at the other together with the side walls 67 at the ends of the blank.

Referring particularly to FIGS. 7–14 and 22, the sheet 38 of tape material is fed over the fixed blade 45 of the tape applying device and across the application slot 48 from a roll supply 68 thereof mounted at one side of the device. The supply roll 68 is mounted for rotation on a drum 69 supported in a conventional manner in such a way that the tape may be unrolled and withdrawn therefrom without excessive force. Mounted between the supply roll and the fixed blade are a first and second pair of feeding folding rollers 71 and 72, and 73 and 74, respectively, and a pair of final feeding rollers 75 and 76 adjacent the blade. The first and second feeding and folding rollers 71 and 72 and 73 and 74 are mounted for rotation between a pair of spaced side frames 77 which, in turn, are suitably mounted from the machinery foundation by means not shown. The sheet material, which for this application may be a dead soft aluminum foil coated with a suitable heat and pressure-sensitive adhesive, is drawn through the slot formed between a pair of spaced guide plates 78 extending between the side frames 77. The guide plates 78 are flanged adjacent their ends to fix the width of the slot between them and thereby position the sheet laterally with respect to the feeding and folding rollers and the remainder of the mechanism.

The rollers 72 and 74 are driven from a drive shaft 79 rotatably mounted in the side frames 77. The drive shaft 79 is fixed to one end of a driving link 81 which, in turn, is pivotally attached (at its other end) to a reciprocating shaft 82 of a driving solenoid 83. Adjustable stops 84 and 85 are provided for assuring that the driving link moves through a fixed angle which, in turn, will determine the amount of tape material fed in a given stroke of the solenoid 83, as will be explained more fully hereinafter. The rollers 72 and 74 are driven from the drive shaft 79 through gears 86 at the end of the rollers meshing with a drive gear 87 connected to the drive shaft 79 by a Sprague clutch 88, shown generally in FIG. 14. The Sprague clutch 88 comprises essentially a driving core 89 fixed to the drive shaft 79 and a driven shell 91 surrounding the core 89. The core 89 contains inclined recesses 92 adjacent its periphery for holding ball or roller friction connectors 93 which are adapted to engage the shell 91 only when the core 89 rotates in one direction. For instance, it will be seen that when the shaft 79 for the core rotates clockwise in FIG. 14, the friction connectors 93 will roll or slide along the inclined surfaces 94 of the recesses and jam themselves between these surfaces 94 and the shell 91, thereby providing a driving connection between the core 89 and the shell 91. However, when the core 89 is rotated in the opposite direction, the connectors 93 will drop into the deepest points 95 of the recesses and will not drive the shell 91. Thus, this type of clutch only operates to drive the shell 91 when the drive shaft 79 rotates in one direction, i.e., clockwise as shown. Thus, the feeding and folding rollers are only turned through the above described gearing when the drive shaft 79 is rotated clockwise. The rollers 71 and 73, in turn, are driven through gears 96 attached to their ends, which mesh with the driving gears 86 for the rollers 72 and 74.

The first set of rollers 71 and 72 is specially designed to fold one edge 97 of the tape sheet 38 at right angles to the sheet, as shown most clearly in FIGS. 8 and 9. The top roller 71 has a right angular flange 98 which nests radially with the end of the roller 72 for this purpose. As shown in FIG. 8, the edge 97 of the sheet will be bent in gradually as it is drawn between the rolls 71 and 72 and into contact with the flange 98 until it finely extends at right angles to the remainder of the sheet 38, as shown most clearly in FIG. 9. A folding pin 99 is located between the first and second sets of feeding and folding rollers to contact the bent edge 97 of the tape and bend it further over upon itself to form an acute angle between the folded edge and the remainder of the tape, as shown in FIG. 10. It should be mentioned here that the sheet 38 of tape material is being fed along with the adhesive side of the tape facing downward so that when the tape is folded over in this manner the adhesive surface of the tape will be folded over upon itself. This folding operation is completed by the second set of feeding and folding rolls 73 and 74. The bottom roll 74 in this set is relieved adjacent one edge to form an annular recess 101 for receiving the fold, and, as shown most clearly in FIG. 11, the fold is completed merely by pressing the folded edge flat against the remainder of the sheet. This fold will form the pull tab 37 in the resulting tape strip.

The final feeding rolls 75 and 76 are mounted one above the other to form a nip just prior to and aligned with the top surface of the fixed blade 45 of the tape applying device. The larger upper roll 75 is driven by chain drive 102 from an intermediate drive shaft 103. The rolls 75 and 76 are mounted for rotation on shafting 104 extending between suitable framework 105, shown schematically in FIG. 7, and the chain drive 102 consists of conventional chains and sprocket wheels affixed to the shafts 103 and 104. The intermediate drive shaft 103 is driven through a friction slip clutch 106 by a concentric outer shaft 107 mounted for rotation on the intermediate shaft 103. The outer shaft 107, in turn, is driven through a similar chain drive 108 from one end of the shaft 109 for the upper folding roll 71. The gearing and sprocket sizes are chosen so that the final feed rolls 75 and 76 tend to turn at a circumferential speed greater than that of the feeding and folding rolls 71 and 72 and 73 and 74. When this occurs the friction clutch 106 slips and allows the final feeding rolls 75 and 76 to rotate and feed the sheet 38 forward by the prescribed amount while maintaining the sheet taut between the final feeding rolls and the feeding and folding rolls. The upper and lower feeding and folding rolls in both sets of rolls 71 and 72 and 73 and 74 are resiliently urged towards one another by adjustable springs mounted in the side frames 77.

As indicated hereinbefore, the can blank 32 is registered in position in the tape applying device, itself, with its application area 35 registered with the tape application slot 48 defined between the fixed blade 45 and the guide plate 47; whereas the sheet 38 of tape material is fed over the fixed blade 45 out across the tape application slot 48 so that the end of the sheet 38 is registered with the application area 35 of the blank. At this point, the blank 32 is resting on the table 65. The table 65 is sufficiently rigid to be supported adjacent its ends by a supporting block 112, as best shown in FIG. 15, which in turn, is bolted or otherwise secured to a base plate 113. The outer ends of the guide plate 47 at each side of the feeding slot 66 are bolted to the supporting block 112, as shown in FIG. 15.

As will be explained more fully hereinafter, the movable blade 46 has a lower position in contact with the tape on the blank 32 and an upper position above the fixed blade 45 and out of the application slot 48. The movable blade 46 has an extension, or finger, 114 at each of its ends which extends downwardly into the application slot 48 and these fingers 114 are long enough so that they remain in the slot even when the blade is in its uppermost position. The fixed blade 45 is mounted from the end plates 115 resting on the supporting block 112, and is resiliently urged against, either the movable blade 46, or the fingers 114 which depend therefrom. The fixed blade 45 is supported on horizontal rods 116 which extend through correspondingly located vertical brackets 117 bolted to one side of the end plates 115, as shown in FIG. 7 and to the right of FIG. 15. The rods 116 extend through mating holes in the vertical brackets 117 and are spring loaded outwardly of the brackets by compression springs 118 fitted around the rods between the brackets 117 and adjustable flanged nuts 119 threaded onto the ends of the rods 116. Thus, the extent to which the fixed blade 45 is urged against the movable blade 46 may be varied by adjusting the flanged nuts 119 at the ends of the rods 116.

The fixed blade 45 is positioned sufficiently above the table 65 to allow the blank 32 and the dogs 52 which move and position it to pass underneath the blade as the blanks are moved from one position to another, as illustrated in FIGS. 22–24. A horizontal guide 121 is spaced the fixed blade 45 to assure that the tape sheet 38 does not lift from the blade and to guide the sheet into position over the blank 32. The guide 121 is bolted to vertical standards 122 positioned at each side of the fixed blade 45, and the standards also have horizontal extensions 123 which overhang the fixed blade 45. The horizontal extensions 123 are spaced at their ends from one another by a distance slightly greater than the width of the sheet 38 so that the extensions 123 position the sheet laterally, or longitudinally of the application slot 48 to assure that the end of the sheet 38 is properly registered with the application area 35 of the blank 32. The extensions 123 perform the additional function, together with the vertical standards 22, of cooperating with the resiliently mounted horizontal rods 116 for holding the fixed blade 45 in position at one side of the slot 48.

The fixed blade 45 and the movable blade 46 each are substantially rectangular in cross section. The fixed blade 45 has a flat top surface which terminates in a fixed shearing edge 125 at the application slot 48. The surface of the fixed blade between the fixed shearing edge 125 and the bottom of the blade acts as an end guide surface 126 which, together with the guide plate 47, defines the application slot 48. The end guide surface 126 is tapered away from the fixed shearing edge 125 slightly to assure that the end guide surface 126 will not interfere with the shearing action of the blades. The movable blade 46 has a flat bottom surface 127 which acts as a pressing surface for pressing the severed tape strip 31 into contact with the can blank 32 and continues to apply pressure to the tape to affix it to the blank. The two longitudinal side surfaces of the movable blade are flat and the pressing surface forms a movable shearing edge 128 where it joins one of these side surfaces at the corner of the movable blade adjacent the fixed blade 45. Since, as explained hereinbefore, the fixed blade 45 is urged against the movable blade 46 (or at least against the depending fingers 114 thereof when the movable blade is in its uppermost position), the fixed shearing edge 125 of the fixed blade and the movable shearing edge 128 of the movable blade are maintained in cooperating relation with one another for severing the tape extending across the application slot 48 when the movable blade 46 enters the slot. The application slot 48 is elongated to correspond with the elongated strip 31 of tape to be applied to the blank 32. The movable blade 46 is quite a bit longer than the application area 35 of the blank 32 since the pressing surface 127 thereof extends completely along the application area and the fingers 114 which depend from the blade must enter the application slot 48 beyond the application area. Since the application slot 48 must receive the fingers 114, it also extends considerably beyond the ends of the application area 35 of the blank.

As shown most clearly in FIGS. 15 and 16, the movable blade 46 is bolted to the end of a horizontal guide frame 129 in such a way that it depends therefrom into the application slot 48. Electric heaters 131 are bolted to opposite sides of the movable blade 46 and heat it to a suitable temperature for applying heat and pressure to the tape strip 31 during the pressing step which will be described more fully hereinafter. These heaters 131 are connected to a suitable power source, not shown. The movable blade 46 is bolted to the guide frame 129 through a suitable layer of insulation 132 and through a cooling jacket 133 which prevent the guide frame 129 from being heated to a point which might cause distortion in the operation of the movable blade 46. Coolant is circulated through the cooling jacket 133 through piping 134 connected to a circulating source, not shown.

The guide frame 129 is mounted for vertical reciprocating movement on a pair of upright cylindrical posts 135, through suitable bushings 136 secured to the frame 129. A driving shaft 137, shown in FIG. 7, turned by a power source, not shown, has a flanged crank 138 at one of its ends, as shown in FIGS. 7, 25, and schematically in FIG. 26, which turns with the drive shaft 137 to provide the driving force for reciprocating the movable blade 46. The movable blade 46 is connected to the flange 138 through a pin 139 pivotally connected to one end of a compression link 14a which includes a hydraulic spring 141, and which is attached to the guide frame 129 by a yoke 142 secured to the top of the frame. The link 140 is attached to the yoke 142 in such a way that it is capable of pivoting from side to side to allow for rotation of the crank 138 attached to its other end.

To compensate for possible distortion of the pressing surface 127 of the somewhat elongated movable blade 46, an adjustable pressure plate 143 is provided in the table 65 directly in the path of the movable blade 46. This pressure plate 143 is in the form of a bar slightly wider and longer than the application area 35 of the blank 32. The pressure plate 143 is held in position in a corresponding recess in the table by a series of vertical and horizontal set screws 144 and 145, respectively, which are adjustable from under the table 65 and through its end surface. Normally, this type of distortion would be due to the blade 46 bowing upwardly somewhat at its ends, as shown schematically in FIG. 16. This can be compensated for, once heat is applied uniformly to all of the parts, by adjusting the ends of the pressure plate 143 up slightly as shown in FIG. 16. Since the table 65, itself, is heated by electric heaters 146 inserted therein, there may also be some distortion of the table which must be compensated for by adjusting the pressure plate 143. However, it is the intention of this arrangement that the pressure plate 143 be capable of adjustment all along the application area 35 of the blank so that the pressing surface 127 of the movable blade applies uniform pressure from end to end of the application area. It should be noted that recesses 147 are provided in the end plates 115 for accommodating the fingers 114 depending from the movable blade 46 when the pressing surface thereof is in contact with the tape applied to the blank. As shown in FIGS. 15 and 22, the supporting block 112 is recessed underneath the table 65, both to provide access to the vertical set screws 144 and to receive a cooling jacket 148 for preventing heat from the table 65 from passing to the base plate 113. The cooling jacket 148 is connected to a suitable circulating source, not shown, by piping 149.

In operation, a can blank 32 and a new end of the tape sheet 38 are moved into position under and across the application slot 48 approximately simultaneously during the time when the movable blade 46 is adjacent the top of its stroke, and above the slot 48 as illustrated in the diagram of FIG. 26. As explained hereinbefore, the fore and aft position of the blank 32 is determined exactly by the solenoid operated stops 63 at one side of the table 65 and the dogs 52 which drive the blank into position, and its lateral position by the feeding slot 66 in the guide plate 49. These parts and the side plates 51 of the apparatus described in conjunction with FIGS. 18–21 are so located that the application surface 35 of the can is registered with the application slot 48 and, more importantly, with the end of the tape sheet 38 which is passed across the slot above the blank. Correspondingly, the tape sheet 38 is metered across the application slot 48 by the final feeding rolls 75 and 76 and positioned longitudinally of the application area 35 by the horizontal guide 121 above the fixed blade 45. As the crank 138 continues to rotate the movable blade is moved downwardly toward the tape, as shown in FIG. 23, until its shearing edge 128 and pressing surface 127 contacts the tape. Continued downward movement of the movable blade 46 causes the movable shearing edge 128 of the movable blade and the fixed shearing edge 125 of the fixed blade to cooperate to sever the desired tape strip 31 from the sheet. The velocity of the pressing surface 127 of the movable blade 46 towards the blank 32 is substantially greater than the free falling velocity of the now severed tape strip 31 with the result that the severed tape remains flat against the pressing surface 127 of the movable blade until it contacts the blank. Even though the severed tape strip 31 normally should remain in contact with the pressing surface 127 of the movable blade in this manner, if it should tend to become displaced therefrom for any reason, it will be maintained in position in registration with the application surface 35 of the blank by the guide plate 47 and the end guide surface 126 of the fixed blade which form the sides of the tape application slot 48. It should be noted that the severing edges 128 and 125 of the movable blade and the fixed blade are parallel to one another, both vertically and horizontally, with the result that the strip 31 is severed from the tape sheet 38 simultaneously all along the length of the strip. Similarly, the pressing surface 127 of the movable blade comes into contact with the severed strip 31 simultaneously all along the length of the strip and normally maintains itself in contact with the strip in this manner until the strip is applied to the blank 32. The top of the table 65 also is parallel with the pressing surface 127 of the movable blade 46 so that the severed strip is pressed against the application area 35 of the blank positioned on the table 65, simultaneously all along the length of the application area 35. The strip 31 is first pressed into contact with the blank 32 not long after the flanged crank 138 driving the blade 46 passes through the midpoint of its downward stroke, or approximately 20°–30° past the midpoint, expressed in terms of rotation of the crank 138. From this point, until the end of the dwell period of the movable blade 46, the motion of the continuously rotating crank 138 is taken up by the compression of the liquid spring 141.

As mentioned hereinbefore, the driving crank 138 operates continuously at a constant rotative speed to drive the movable blade 146 and press it against the tape during its dwell period through the resilient link 140 which includes the spring 141. The spring 141, in turn, compresses to absorb the motion of the crank 138 during the dwell period of the movable blade 46. Thus, the operation of all parts of the tape applying device of this invention are timed with respect to the rotation of the driving crank 138, since the sequence of operation for these parts depends upon the position of the movable blade 46 with respect to the application slot 48. For instance, referring to the diagram of FIG. 26, the point Y represents the bottom of the stroke of the driving crank 138, the middle of the dwell period of the movable blade 46, and the maximum amount of pressure exerted by the pressing surface 127 of said blade upon the tape 31 applied to the application area 35 of the blank 32. Considering that the crank 138 rotates counterclockwise from the position Y to the position T where it lifts the movable blade 46 off the tape 31 on the blank, the arc TCU represents the time that the movable blade remains in the application slot 48 after leaving the tape 31. In other words, the severing edge 128 of the movable blade passes the edge 128 of the fixed blade 45 at a time corresponding to the point U in the rotation of the crank 138. Thus, shortly after the point T when the pressuring surface 127 of the blade 46 clears the slot 66U, the stops 63 may be retracted and the driving bars 53 may be operated to move the taped blank 32 towards its next position. Obviously, at some time after the trailing end of the blank 32 passes the stops 63 but before the leading end of the next blank would pass the stops, the stops 63 are again extended to hold the next blank in position. Similarly, at some time after the point U in the rotation in the crank 138, and after the movable blade 46 leaves the application slot 48 the feeding rolls 75 and 76 are actuated by the driving lever 81 to advance the sheet 38 for positioning a new tape end over the application slot. The point X represents the top of the stroke of the driving crank and the point R represents the time when the movable blade 46 first enters the application slot 48 on its downward stroke. Thus, the tape end must be fully positioned across the application slot at some time between the points U and R in the rotation of the driving crank 138. Theoretically, at least, the new blank 32 need not be in position underneath the application slot 48 until just before the driving crank 138 reaches the point S in its travel, or the beginning of the dwell period of the movable blade 46. This dwell period is represented by the arc SCT in the rotation of the driving crank 138. The various operations just described are performed automatically in the device of this invention through conventional timing means set to operate in timed relation with the operation of the driving crank 138 in the manner just described.

When the tape 31 is to be applied as a tear, or opening, strip for a can of the type described hereinbefore, it may be fabricated from any suitable materials. However, it is advantageous that it be fairly rigid and metallic in nature. For instance, a tape formed from dead soft, dull aluminum foil approximately 5 mils thick, has been found to be particularly suitable for this purpose. This tape is coated on one side with a polyurethane adhesive applied over a buna S rubber primer layer which helps the adhesive adhere to the foil. Preferably, also a release or backsize coating is applied to the other side of the foil to facilitate unrolling of the sheet material for subsequent use since the sheet normally is rolled for storage and shipment after it is manufactured. The adhesive used is a heat and pressure-sensitive adhesive which is non-tacky at normal ambient temperatures and pressures. However, it will form a firm bond to the metal of the can when the proper amount of heat and pressure is applied thereto for the required time. In other words, as is well known for this type of adhesive, there is a time, pressure, and temperature relationship which must be satisfied to actuate the adhesive.

In the device of FIGS. 7–26, the pressing surface 127 of the movable blade 46 and the table 65 each are heated to a temperature of approximately 250–300° F. With the driving crank operating at a speed of at least 300 r.p.m. (in order to process at least 300 can blanks per minute), the crank rotates 360° in one-fifth of a second. Inspection of the diagram of FIG. 26 will show that the arc SOT is somewhat less than 180° and that therefore the dwell period during which pressure is applied to the tape on the blank is correspondingly less than one-tenth of a second. The maximum pressure exerted by the pressing surface 127 on the tape during the dwell period is in the neighborhood of 3000 pounds per square inch and this pressure occurs mainly at the point Y in the rotation of the driving crank. There normally is not sufficient heat and pressure applied to the tape (for a long enough period) to complete the bond between the tape 31 and the blank 32 during the tape applying operation. However, the heat and pressure applied at this point is sufficient to adhere the tape firmly in position until a subsequent heat and pressure step. A bank of heated pressing rolls 150 is illustrated at the right of FIG. 12 for applying additional heat and pressure to the tape adhered to the blank 32 to complete the bond between the tape 31 and the blank 32 and assure that there will be no leakage through or underneath the tape, or into or out of the can, prior to removal of the tape strip 31, as illustrated in FIG. 27.

Having now described the invention in specific detail and exemplified the manner in which it may be carried into practice, it will be readily apparent to those skilled in the art that innumerable variations, applications, modifications, and extensions of the basic principles involved may be made without departing from its spirit or scope.

Wherefore we claim:

1. A device for applying an elongated strip of adhesive sheet material to a correspondingly elongated application area extending across an application sheet, which comprises a table below said application sheet and extending transversely thereof, a fixed shearing blade above the application sheet and presenting a fixed shearing edge spaced above said application surface, said fixed blade extending transversely of the application sheet along one edge of said application area, a guide extending transversely of the application sheet along the other edge of said application area, said fixed blade and said guide defining between them an elongated application slot slightly wider than the width of the strip to be applied to the application sheet, means for advancing a sheet of said adhesive material over said fixed blade and approximately into contact with said guide, and a movable shearing blade comprising an elongated pressing foot approximately as wide as said slot, said movable blade being adapted to advance into contact with the end of said sheet and into said slot for cooperating with said fixed blade for severing the strip therefrom along said fixed shearing edge and then pressing the severed strip down into contact with and flat against the application sheet simultaneously all along the length of the strip, said movable blade having a dwell period during which said foot continues to apply pressure to the strip to adhere the strip to the application sheet as said sheet is supported on the table.

2. A device according to claim 1, which further comprises at least one finger extending downwardly from said movable blade into the application slot, a portion of said finger remaining in said slot when the movable blade is in its uppermost position, whereby said finger guides said movable blade into and out of the application slot.

3. A device according to claim 2, wherein said movable blade presents a movable shearing edge for cooperating with said fixed shearing edge as the movable blade enters the application slot, which further comprises resilient means for urging said movable blade and said fixed blade towards one another to assure that their respective shearing edges will remain in proper cutting relation with respect to one another, said finger preventing said resilient means from moving said blades out of alignment with one another when the movable blade is in its uppermost position above said slot.

4. A device according to claim 1, which further comprises an elongated pressure plate positioned in said table in the path of the movable blade, said pressure plate being adjustable along its length to compensate for distortion of said movable blade or said table.

5. A device according to claim 1, which further comprises an elongated resilient pressure plate positioned in said table in the path of the movable blade to compensate for distortion of said movable blade or said table.

6. A device according to claim 1, wherein a passageway is defined between said fixed blade and said table and between said guide and said table to accommodate the application sheet and allow said sheet to be moved into and out of positon underneath said movable blade, which further comprises means for engaging the application sheet and moving it into and out of position as aforesaid and registering the application area of said sheet with said application slot prior to the application of said strip to said area.

7. A device according to claim 1, wherein the movable blade is reciprocated with respect to said application surface by continuously operating driving means, and which further comprises resilient means connecting said driving means and said movable blade, said resilient means taking up the motion of said driving means and being compressed to apply increased pressure to the severed strip through said blade during said dwell period.

8. A device according to claim 1, wherein at least one of said movable blade and said table is heated to apply heat by conduction to the adhesive strip during said dwell period.

References Cited

UNITED STATES PATENTS

| | | | |
|---|---|---|---|
| 1,127,843 | 2/1915 | Allen | 156—519 |
| 1,419,789 | 6/1922 | Webb | 83—635 |
| 3,355,995 | 12/1967 | Borkmann et al. | 156—521 |
| 2,285,447 | 6/1942 | Lichter | 156—256 |

DOUGLAS J. DRUMMOND, Primary Examiner

U.S. Cl. X.R.

83—635